3,796,609
ARC WELDING FLUX
John Gonzales and Ronald F. Young, Willoughby, Ohio, assignors to The Lincoln Electric Company, Cleveland, Ohio
No Drawing. Filed Nov. 1, 1971, Ser. No. 194,568
Int. Cl. B23k 35/34; C22b 9/10
U.S. Cl. 148—24                               3 Claims

ABSTRACT OF THE DISCLOSURE

A welding flux which combines the advantage of excellent slag removal in multiple pass deep groove welding and is "neutral" in that the weld metal analysis is relatively unaffected by changes in arc voltage.

---

This invention pertains to the art of electric arc welding and more particularly to a flux composition useful in multiple pass deep groove submerged arc welding.

In the art of submerged arc welding fluxes there are fluxes which are referred to as "active" fluxes and those which are referred to as "neutral" fluxes. The active fluxes are generally used for single pass welds and contain powerful deoxidizers designed to compensate for dirt and other impurities on and in the base metal. Such fluxes require very exact procedural control for multiple pass applications because it is relatively easy to get into a deoxidizer buildup in the weld metal which results in hard welds that can crack during fabrication or service. These hard welds are caused if a higher welding voltage than specified is used. Under high voltage conditions considerably more flux is melted and with active fluxes there is a correlating increase in the deoxidizers in the weld metal. Of course this can be controlled by setting a fixed welding voltage for a specific application. Experience indicates however that such information seldom reaches the man who operates the welding machine. In fact, most supervisors and welders will employ maximum voltage to obtain wide beads on cover passes. The smoothness of such wider beads makes slag removal easier and minimizes the amount of grinding. This applies especially to cover passes of welds that may be subject to radiographic inspection and thus require smooth contours. Thus the cover beads are usually harder than other beads when active fluxes are used. The widest beads are usually the hardest beads.

For example, test welds using active fluxes at 450 amperes, 26 volts, may have a hardness of not over 200 BHN in either the "as welded" or the "post weld heat treat" condition. However, when the voltage is increased to 35 volts, the hardness of the weld may be as high as 230 BHN in the "as welded" condition. In many cases even with post weld heat treat it is not possible to reduce this hardness significantly. This hardness is unacceptable in many applications on pressure vessels where engineers now demand hardness limits of 200 to 225 BHN.

Neutral and near neutral fluxes contain no or a minimum of deoxidizers and do not have this problem on multiple pass welds. Except for the effects of base metal dilution, chemical composition and hardness of the weld bead remain fairly uniform and retain the properties that can be anticipated for the nominal composition of electrodes and base metal regardless of changes in the arc voltage. The neutral and near neutral fluxes not only have a hardness which will average 20 BHN lower than those obtained with active fluxes but, in addition, exhibit an increase of only 15 BHN as the welding voltage changes between 26 and 35 volts. Further, these welds can be softened by post weld heat treating.

For this reason the neutral type flux has been accepted as the safest composition when making multiple pass welds. Even if the operator deviates from the prescribed procedure when using neutral fluxes, the resulting weld hardness is satisfactory. Up to this time, however, there has been a substantial problem with neutral fluxes which has limited their use. In making multiple pass welds it is necessary to clean the slag from the top of each bead before putting in the next bead. In order to do this economically, the flux should be easily removable and the bead shape should be such that there is no flux trapped along the edge of the bead. If trapped flux is not completely removed, it will cause blemishes on the X-ray which is unsatisfactory. In addition to the ease of flux removal, the contour of the bead is important, especially on cover passes if X-ray quality welds are to be made.

The present invention overcomes all of these problems and provides a neutral flux for multiple pass welding which permits the welding operator some leeway in the prescribed welding voltage and yet has the economy of excellent slag removal and good bead shape.

In accordance with the present invention, a flux of the character described is provided by employing a mixture of principal ingredients including carefully controlled amounts of dead burned magnesite (87% MgO), calcined manganese ore (77.5% MnO), calcined bauxite (88% $Al_2O_3$), zircon, calcium fluoride, quartz, and no or a minimum amount of deoxidizers such as silicon and manganese metal. These are mixed with a bonding agent such as sodium silicate; the mass being heated sufficiently to set or sinter the binder to form an agglomerate which is then ground up to provide a granular flux. By using minimum amounts of deoxidizers, the slag is neutral. By carefully balancing the ratios of magnesite, manganese ore, bauxite and zircon, flux removal and bead shape is greatly improved.

The following will indicate generally the ingredients in the preferred range thereof which may be used in making up our present improved arc welding composition in weight percent:

| Ingredient | Range |
|---|---|
| Dead burned magnesite (87% MgO) | 15.0 to 24.0 |
| Calcinated manganese ore (77.5% MnO) | 8.7 to 17.3 |
| Calcined bauxite (88% $Al_2O_3$) | 20.4 to 33.6 |
| Silicon | 0.0 to 1.5 |
| Ferromanganese silicon (64% Mn, 29% Si) | 0.0 to 2.0 |
| Calcium fluoride | 7.0 to 13.0 |
| Zircon | 10.0 to 21.0 |
| Quartz | 3.0 to 6.0 |
| Dry sodium silicate | 3.0 to 7.0 |

More specifically, the following specific formulation has been found satisfactory in practice:

| Ingredient | Range |
|---|---|
| Dead burned magnesite (87% MgO) | 16.6 to 20.2 |
| Calcined manganese ore (77.5% MnO) | 11.7 to 14.3 |
| Calcined bauxite (88% $Al_2O_3$) | 23.4 to 28.6 |
| Silicon | 0.9 to 1.2 |
| Ferromanganese silicon (64% Mn, 29% Si) | 0.5 to 0.7 |
| Calcium fluoride | 9.7 to 11.9 |
| Zircon | 16.8 to 20.6 |
| Quartz | 4.8 to 6.0 |
| Dry sodium silicate | 5.0 to 6.2 |

The above ranges are for ores as mined and commercially available. These ranges stated for the generally pure chemical compound or element are as follows in weight percent:

| | |
|---|---|
| MgO | 14.4 to 17.6 |
| MnO | 9.1 to 11.1 |
| $Al_2O_3$ | 20.6 to 25.2 |
| Silicon | [1] 1.0 to 1.4 |
| Manganese metal | [1] 0.3 to 0.5 |
| $CaF_2$ | 9.7 to 11.9 |
| Zircon | 16.8 to 20.6 |
| $SiO_2$ | 4.8 to 6.0 |
| Dry sodium silicate | 5.0 to 6.2 |

[1] Total.

In all of the above, the ingredients all finely ground, are mixed with a sodium silicate solution and added to a rotary kiln. The kiln is rotated with heating at about 800° C. for a length of time sufficient to thoroughly dry the ingredients and form them into chunks, with insolubilized sodium silicate as a binder.

The chunks are removed from the kiln, ground, and screened. The material less than 14 mesh and larger than 100 mesh is recovered as product and consists of agglomerates of finely divided flux particles in generally uniformly distributed condition bonded together with the sodium silicate.

MnO as used in the specification and claims is intended to include all oxides of manganese at any oxide level, e.g., $Mn_xO_x$ or mixtures of any two or more.

Having thus described our invention, we now claim:

1. A flux composition suitable for submerged arc welding comprised of the following ingredients in weight percents.

| | |
|---|---|
| Dead burned magnesite (87% MgO) | 15.0 to 24.0 |
| Calcined manganese ore (77.5% MnO) | 8.7 to 17.3 |
| Calcined bauxite (88% $Al_2O_3$) | 20.4 to 33.6 |
| Silicon | 0.0 to 1.5 |
| Ferromanganese silicon (64% Mn, 29% Si) | 0.0 to 2.0 |
| Calcium fluoride | 7.0 to 13.0 |
| Zircon | 10.0 to 21.0 |
| Quartz | 3.0 to 6.0 |
| Dry sodium silicate | 3.0 to 7.0 |

2. The arc welding flux of claim 1 wherein said ingredients have the following range of ingredients.

| | |
|---|---|
| Dead burned magnesite (87% MgO) | 16.6 to 20.2 |
| Calcined manganese ore (77.5% MnO) | 11.7 to 14.3 |
| Calcined bauxite (88% $Al_2O_3$) | 23.4 to 28.6 |
| Silicon | 0.9 to 1.2 |
| Ferromanganese silicon (64% Mn, 29% Si) | 0.5 to 0.7 |
| Calcium fluoride | 9.7 to 11.9 |
| Zircon | 16.8 to 20.6 |
| Quartz | 4.8 to 6.0 |
| Dry sodium silicate | 5.0 to 6.2 |

3. The arc welding flux of claim 1 wherein the pure chemical compounds or elements are comprised of the following approximate formulation.

| | |
|---|---|
| MgO | 14.4 to 17.6 |
| MnO | 9.1 to 11.1 |
| $Al_2O_3$ | 20.6 to 25.2 |
| Silicon | [1] 1.0 to 1.4 |
| Manganese metal | [1] 0.3 to 0.5 |
| $CaF_2$ | 9.7 to 11.9 |
| Zircon | 16.8 to 20.6 |
| $SiO_2$ | 4.8 to 6.0 |
| Dry sodium silicate | 5.0 to 6.2 |

[1] Total.

References Cited
UNITED STATES PATENTS

| | | | |
|---|---|---|---|
| 3,663,313 | 5/1972 | Oberly | 148—26 |
| 2,951,000 | 8/1960 | Kennedy | 148—26 |
| 2,527,186 | 10/1950 | Griffiths | 75—57 |
| 3,490,960 | 1/1970 | Arikawa | 148—26 |
| 2,761,796 | 9/1956 | Wasserman | 148—26 |
| 3,023,133 | 2/1962 | Lewis | 148—26 |
| 3,201,292 | 8/1965 | Miltschitzky | 148—26 |
| 3,551,217 | 12/1970 | Coless | 148—26 |
| 3,490,942 | 1/1970 | Lalieu | 148—26 |
| 3,551,218 | 12/1970 | Mordkovich | 148—26 |
| 3,340,104 | 9/1967 | Ballass | 148—26 |

HYLAND BIZOT, Primary Examiner

P. D. ROSENBERG, Assistant Examiner

U.S. Cl. X.R.

75—94